United States Patent
Menig et al.

(10) Patent No.: US 10,930,908 B2
(45) Date of Patent: Feb. 23, 2021

(54) BATTERY MODULE HOUSING, BATTERY MODULE, BATTERY PACK, BATTERY AND VEHICLE, AND ALSO METHOD FOR PRODUCING A BATTERY MODULE, A BATTERY PACK AND A BATTERY

(71) Applicant: Robert Bosch GmbH, Stuttgart (DE)

(72) Inventors: Rainer Menig, Stuttgart (DE); Alfons Doerr, Stuttgart (DE); Andreas Lemke, Stuttgart (DE); Andreas Selent, Leonberg (DE); Benjamin Mangold, Nufringen (DE); Benjamin Kopp, Remseck Am Neckar (DE); Berengar Krieg, Gerlingen (DE); Carsten Mueller, Stuttgart (DE); Jochen Schweinbenz, Stuttgart (DE); Johannes Teuber, Anderson, SC (US); Marcus Hildenbrand, Goeppingen (DE); Maximilian Russ-Mohl, Stuttgart (DE); Stefan Baumann, Altenriet (DE); Steffen Benz, Stuttgart (DE); Timo Kegel, Memmelsdorf (DE); Torsten Koller, Leinfelden-Echterdingen (DE); Xiaofeng Yan, Renningen-Malmsheim (DE); Christian Buder, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 16/061,302

(22) PCT Filed: Nov. 30, 2016

(86) PCT No.: PCT/EP2016/079194
§ 371 (c)(1),
(2) Date: Jun. 11, 2018

(87) PCT Pub. No.: WO2017/097644
PCT Pub. Date: Jun. 15, 2017

(65) Prior Publication Data
US 2018/0366704 A1 Dec. 20, 2018

(30) Foreign Application Priority Data

Dec. 11, 2015 (DE) ............... 10 2015 224 967.0

(51) Int. Cl.
*H01M 2/10* (2006.01)
*H01M 10/04* (2006.01)

(52) U.S. Cl.
CPC ........... *H01M 2/1083* (2013.01); *H01M 2/10* (2013.01); *H01M 10/04* (2013.01); *H01M 2220/20* (2013.01)

(58) Field of Classification Search
CPC ....... H01M 2/1083; H01M 2/10; H01M 10/04
See application file for complete search history.

(56) References Cited

U.S. PATENT DOCUMENTS

| | | |
|---|---|---|
| 5,223,351 A | 6/1993 | Wruck |
| 2010/0026242 A1 | 2/2010 | Forsloew |

(Continued)

FOREIGN PATENT DOCUMENTS

| | | |
|---|---|---|
| CN | 204029956 | 12/2014 |
| CN | 104979595 A | 10/2015 |
| DE | 102008059970 | 6/2010 |
| JP | 2014232735 | 12/2014 |

OTHER PUBLICATIONS

International Search Report for Application No. PCT/EP2016/079194 dated Jan. 30, 2017 (English Translation, 2 pages).

*Primary Examiner* — Olatunji A Godo
(74) *Attorney, Agent, or Firm* — Michael Best & Friedrich LLP

(57) ABSTRACT

The invention relates to a battery module housing ($200_1, \ldots 200_4$) for a battery pack (10), characterized in that: the battery module housing ($200_1, \ldots 200_4$) can contain a large number of battery cells ($100_{111}, \ldots 100_{432}$) which each have a large wall surface ($120_1, 120_2$) and a small wall surface ($130_1, 130_2$), of which small wall surface the surface area is less than a surface area of the large wall surface ($120_1, 120_2$), wherein the battery cells ($100_{119}, 100_{129}$, (Continued)

$100_{132}$, $100_{142}$, $100_{219}$, $100_{229}$, $100_{232}$, $100_{242}$, $100_{319}$, $100_{329}$, $100_{332}$, $100_{342}$, $100_{419}$, $100_{432}$) which can be arranged adjacent to outer sides of the battery pack (10) can be oriented in such a way that their large wall surfaces (120$_1$, 120$_2$) run along the outer sides, so that a force which acts on one of the outer sides can initially be received by one of the large wall surfaces (120$_1$, 120$_2$), and also to a battery module (20$_1$, 20$_4$), to a battery pack (10), to a battery, to a vehicle and also to a method for producing a battery module (20$_1$, . . . 20$_4$), a battery pack (10) and a battery.

19 Claims, 4 Drawing Sheets

(56) References Cited

U.S. PATENT DOCUMENTS

| | | | |
|---|---|---|---|
| 2010/0314182 A1 | 12/2010 | Crain et al. | |
| 2012/0056477 A1* | 3/2012 | Herges | B60L 11/1853 307/10.1 |
| 2012/0301747 A1* | 11/2012 | Han | H01M 2/1005 429/7 |
| 2013/0037336 A1* | 2/2013 | Ojeda | H01M 10/12 180/68.5 |
| 2013/0065087 A1 | 3/2013 | Kim et al. | |
| 2014/0042980 A1 | 2/2014 | Floros et al. | |

* cited by examiner

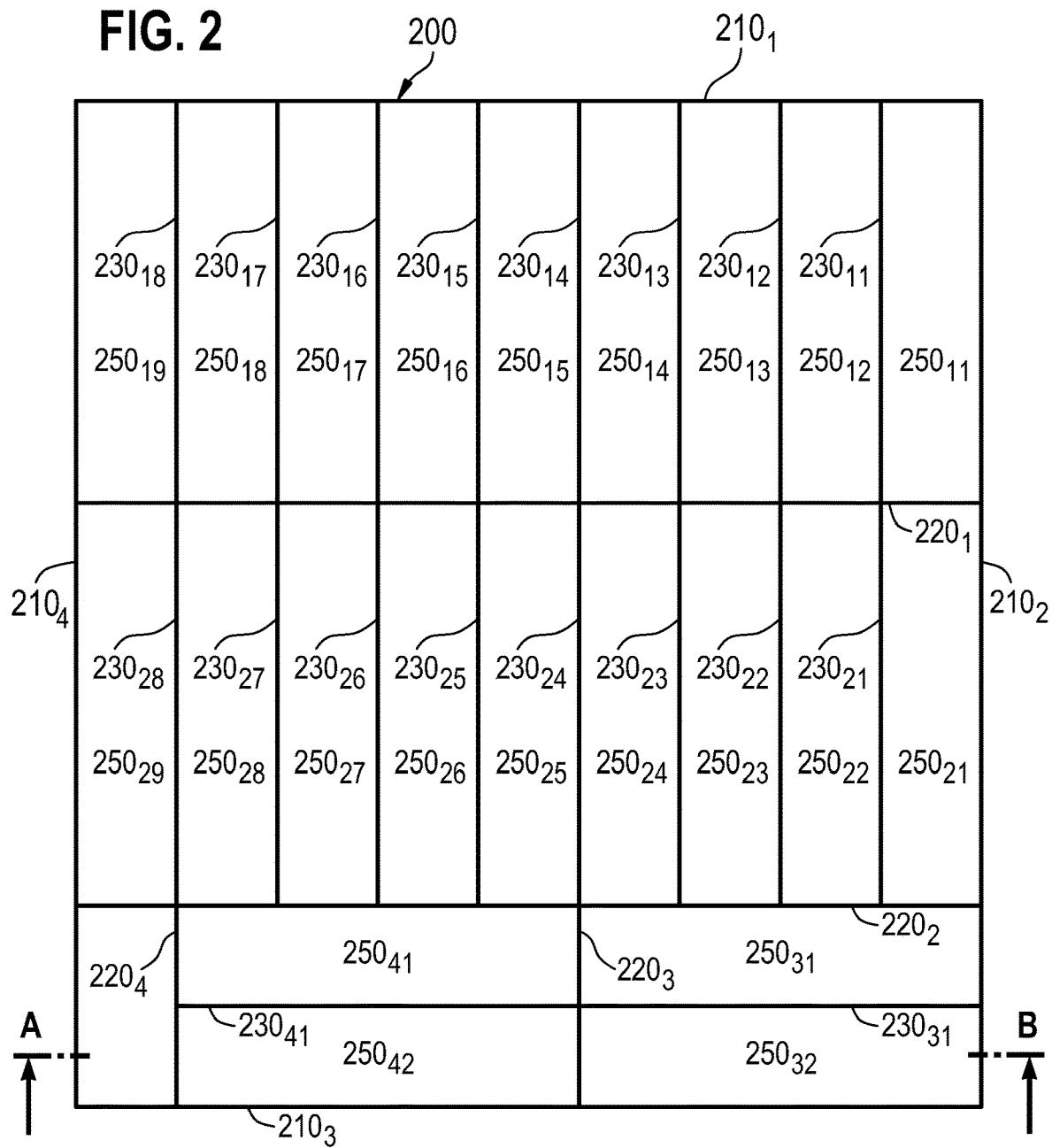
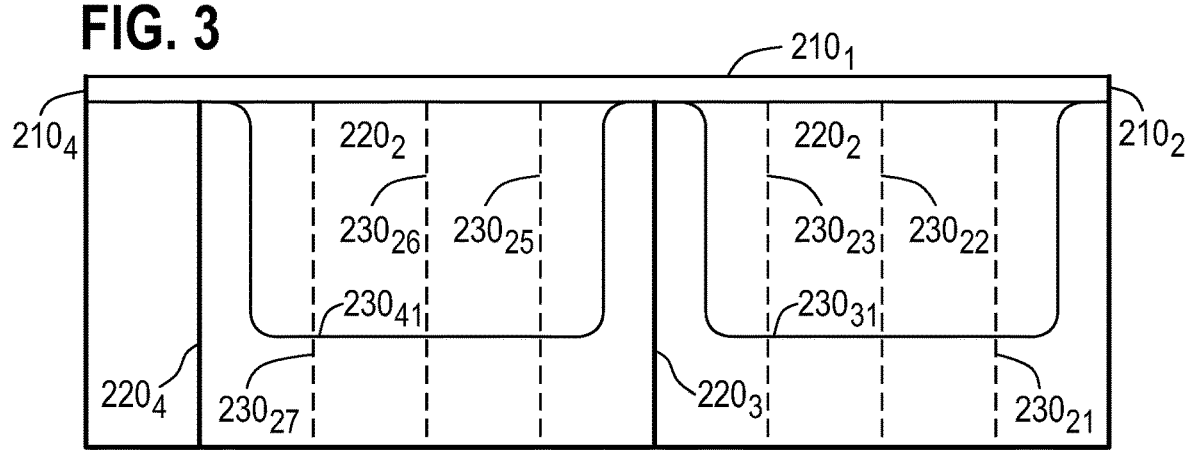

BATTERY MODULE HOUSING, BATTERY MODULE, BATTERY PACK, BATTERY AND VEHICLE, AND ALSO METHOD FOR PRODUCING A BATTERY MODULE, A BATTERY PACK AND A BATTERY

BACKGROUND OF THE INVENTION

The invention relates to a battery module housing or a method. A battery module, a battery pack, a battery and a vehicle as well as a method for producing a battery module, a battery pack and a battery are the subject matter of the invention.

The Japanese patent application JP 2014-232735 discloses a battery module having improved cooling efficiency in a secondary battery. A battery cell of the secondary battery consists of a battery cell housing with a structure such that it is divided into an extension surface and a non-expansion surface. The battery module of the secondary battery is formed by an arrangement of the battery cells, in which the non-expansion surfaces of adjacent battery cells face each other and an external side of the battery module comprises the extension surfaces. If the internal pressure of the battery cell increases, spaces between the battery cells are not closed so that air flows around the battery cells, whereby an efficient cooling is achieved.

An energy storage system which includes a battery cell, a tray for receiving the battery cell and a rack for receiving the tray is known from the American patent application US 2013/0065087. The rack includes a connector unit. The connector unit is configured to connect to the tray inserted into the rack and to vibrate together with the tray when said tray vibrates due to, for example, an earthquake or external impact applied to the rack, thereby preventing an electric connection between the tray and the connector unit from being broken.

The Chinese patent application CN 204029956 U discloses a power battery of an electric automobile, comprising a box body and a box cover, wherein partitioning strips for partitioning an inner chamber of the box body into a plurality of battery mounting chambers and a main control chamber are arranged at a lower edge of the box body. The battery mounting chambers are internally provided with battery packs; a battery management system is mounted inside the main control chamber; a charge/discharge interface is formed in a wall side on one side of the main control chamber of the box body, the battery packs are serially and integrally connected and are connected to the battery management system; the battery management system is connected to the charge/discharge interface; the battery packs consist of a plurality of lithium batteries which are connected to one another in series; a voltage acquisition line is respectively led out to the battery management system from a serial connection line between every two adjacent lithium batteries. The power battery is long in service life, good in heat dissipation performance, better in shock-resistant effect, safe and reliable.

The power battery is simple in wiring, easy to assemble and maintain and simple and convenient to disassemble if one battery is too poor in property and needs to be replaced in the long-term use process of the battery.

SUMMARY OF THE INVENTION

The devices and method according to the invention have the advantage that from a large number of battery cells which each have a large wall surface and a small wall surface, of which small wall surface the surface area is less than a surface area of the large wall surface, the battery cells which are or respectively can be arranged adjacent to the outer sides of the battery pack are or respectively can be oriented in such a way that their large wall surfaces run along the outer sides, so that a force which acts on one of the outer sides can initially be received by one of the large wall surfaces. The large wall surface can thus receive an impact at a corresponding point on the outer side and distribute the impact such that the small side wall surfaces of the battery cells that are located behind said large wall surface and are arranged at right angles are protected. As a result, the safety of the battery pack can be improved.

If the battery module housing comprises a plurality of battery cell chambers for receiving the plurality of battery cells, this has the advantage that the battery cells can be spaced apart from one another. As a result, a temperature control, i.e. cooling or heating, of the battery cells is improved. The battery cells can, furthermore, be electrically, mechanically and/or thermally separated, i.e. insulated, from one another. In addition, a mounting of the battery cells can be simplified.

If the battery module housing comprises a receptacle, such as a receiving chamber, for receiving a device for monitoring or controlling the plurality of battery cells, this has the advantage that the device for monitoring or controlling can be electrically, mechanically and/or thermally separated, i.e. insulated. In addition, a mounting of the device for monitoring or controlling the plurality of battery cells can be simplified.

If the device for monitoring or controlling the plurality of battery cells is designed as a battery disconnect unit, this has the advantage that the electrical connection to the battery cells can be interrupted. This allows the safety and reliability of the battery pack to be further improved.

If the battery disconnect unit comprises a first circuit breaker and a second circuit breaker, this has the advantage that the electrical connection to the battery cells can be interrupted at two poles or respectively at all poles. As a result, the safety and reliability of the battery pack is further improved.

If the first circuit breaker and the second circuit breaker are arranged at right angles to one another, this has the advantage that they cannot be immediately influenced by the applied force. In the event the force, for example in the first circuit breaker, should cause an inadvertent closing of the contact thereof, said force will not be able to simultaneously inadvertently close this contact in the second circuit breaker, which has the same construction as the first, on account of the different orientation of said second circuit breaker. This enables the safety and reliability of the battery pack to once again be improved.

The vehicle can, for example, be designed as a motor vehicle such as an electric motor vehicle, a hybrid vehicle, a plug-in hybrid vehicle, an electric motorcycle (electric bike, E-bike) or as an electric bicycle (pedal electric cycle, pedelec), a marine vessel such as an electric boat or submarine (U-boat), an aircraft or spacecraft.

If a device for monitoring or controlling is provided and disposed in the battery module housing, this has the advantage that the device for monitoring or controlling is in the battery module. This enables the battery to be designed more compactly.

If the device for monitoring or controlling is designed as a battery disconnect unit, this in turn has the advantage that the electrical connection to the battery cells can be interrupted. This allows the safety and reliability of the battery pack to be further improved.

If the first circuit breaker and the second circuit breaker are arranged at right angles to one another, this in turn has the advantage that said circuit breakers cannot be immediately influenced by the applied force. In the event the force, for example in the first circuit breaker, should cause an inadvertent closing of the contact thereof, said force will not be able to simultaneously inadvertently close this contact in the second circuit breaker, which has the same construction as the first, on account of the different orientation of said second circuit breaker. This enables the safety and reliability of the battery pack to once again be improved.

If a crash frame is provided and if the battery module is disposed in the crash frame, this has the advantage that the mechanical stability of the battery pack can be increased. The durability of said battery pack can thus be increased, for example in the event of an accident. This enables the safety and reliability of the battery pack to be further improved.

If a circuit board is provided, the circuit board is disposed on the battery module and connection contacts of said circuit board are electrically connected to electrical connections of the battery cells. This has the advantage that the electrical construction of the battery module can be simplified. As a result, the reliability of the battery module can be increased. In addition, the mounting of the battery module can be simplified. Hence, costs such as production costs can be reduced.

If a battery housing is provided and if the battery pack is disposed in the battery housing, this has the advantage that the battery module can be protected from environmental influences such as moisture respectively humidity. The reliability and/or safety of the battery can thereby be increased.

BRIEF DESCRIPTION OF THE DRAWINGS

Exemplary embodiments of the invention are depicted in the diagrams and explained in greater detail in the following description. In the drawings:

FIG. 2 shows a simplified top view of a battery module housing of the battery pack according to this embodiment of the invention;

FIG. 3 shows a simplified side sectional view of the battery module housing of the battery pack according to this embodiment of the invention;

DETAILED DESCRIPTION

Figure 1:
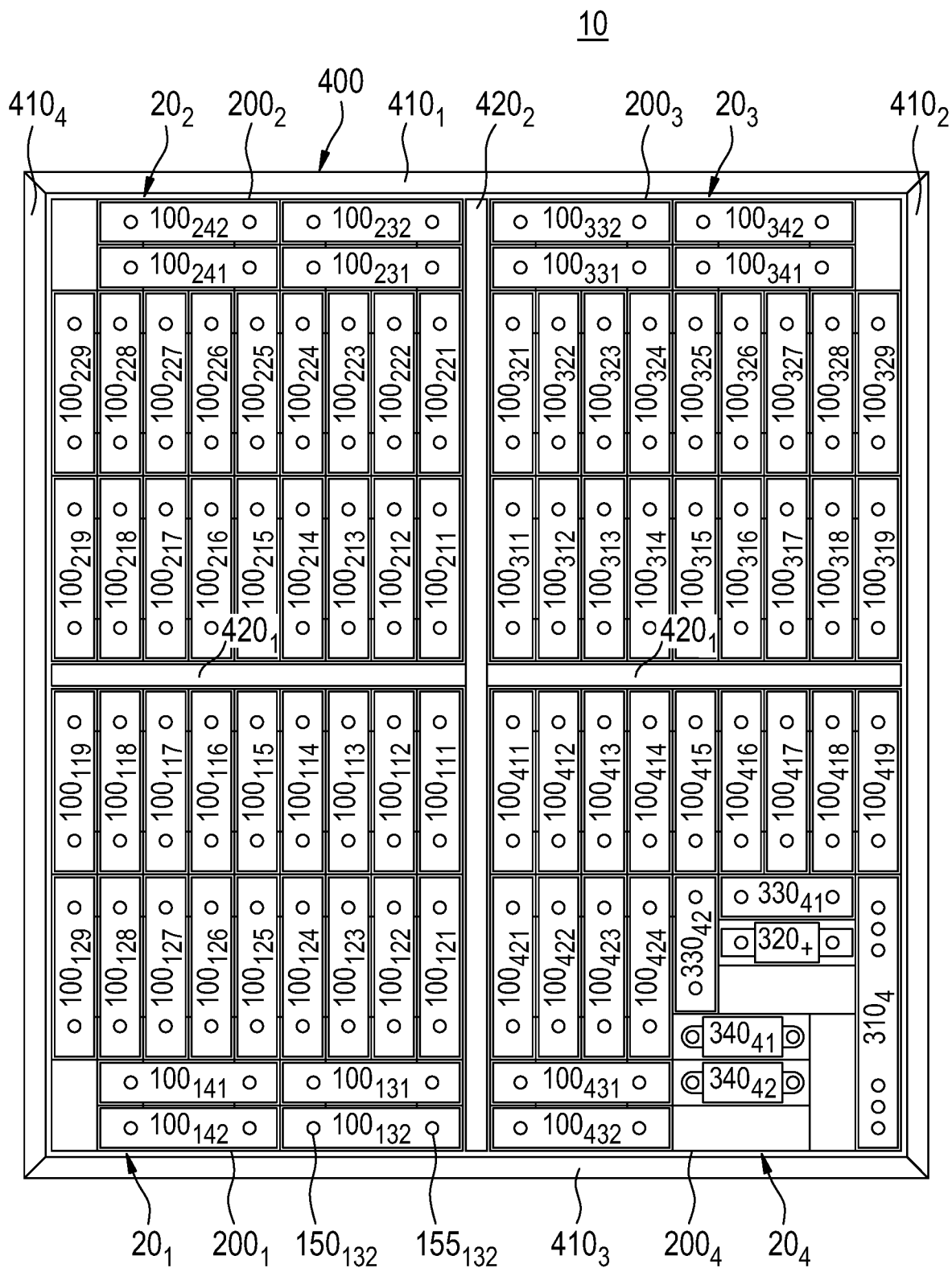
FIG. 1 shows a first simplified top view of a battery pack according to an embodiment of the invention.

FIG. 1 shows a simplified top view of a battery pack 10 according to one embodiment of the invention.

The battery pack 10 comprises a plurality of battery modules $20_1, \ldots 20_4$ and a crash frame 400 which surrounds the plurality of battery modules $20_1, \ldots 20_4$. The plurality of battery modules $20_1, \ldots 20_4$ can, as shown by way of example in FIG. 1, be arranged like a matrix such as 2×2.

The battery modules $20_1, \ldots 20_4$ comprise in each case a large number of battery cells $100_{111}, \ldots 100_{432}$ and a battery module housing $200_1, \ldots 200_4$. As described below in detail with reference to FIGS. 2 and 3, the battery module housings $200_1 \ldots 200_4$ comprise in each case a plurality of battery cell chambers $250_{11}, \ldots 250_{42}$ for receiving the plurality of battery cells $100_{111}, \ldots 100_{432}$. As described below with reference to FIG. 4, the battery cells $100_{111}, \ldots 100_{432}$ have large wall surfaces $120_1, 120_2$ and small side wall surfaces $130_1, 130_2$. The battery cells $100_{111}, \ldots 100_{432}$ are in each case arranged in the battery modules $20_1, \ldots 20_4$ in such a way that the large wall surfaces of the battery cells $100_{119}, 100_{129}, 100_{132}, 100_{142}, 100_{219}, 100_{229}, 100_{232}, 100_{242}, 100_{319}, 100_{329}, 100_{332}, 100_{342}, 100_{419}, 100_{432}$, which are adjacent to the crash frame 400, run along the crash frame 400. In comparison to the small side wall surfaces of the battery cells, the large wall surfaces can better receive and distribute the forces acting from the outside; thus enabling effects of forces acting on the battery modules $20_1, \ldots 20_4$ via the crash frame 400, for example during an accident, to be reduced on the battery cells. For example, the one large wall surface of the battery cell $100_{132}$ or respectively of the battery cell$_{142}$ can receive and distribute an impact at a corresponding position of the crash frame 400 so that the small side wall surfaces of the battery cells $100_{121}, \ldots 100_{124}$ respectively $100_{125}, \ldots 100_{128}$ arranged at right angles behind the battery cell $100_{132}$ respectively $100_{142}$ are protected. As a result, the safety and reliability of the battery pack 10 can be improved. The arrangement of the battery cells $100_{111}, \ldots 100_{432}$ can thereby be adapted to a specification of the battery pack 10 and/or the number of battery cells $100_{111}, \ldots 100_{432}$.

A battery module can, as shown by way of example in FIG. 2 for the battery module $20_4$, further comprise devices ($310_4, 320_4, 330_{41}, 330_{42}, 340_{41}, 340_{42}$) for monitoring and/or controlling this battery module or the plurality of battery modules $20_1, \ldots 20_4$, i.e. of the battery pack 10. The devices for monitoring and/or controlling can, for example, comprise a battery control unit (BCU) $310_4$, a fuse $320_4$, a battery disconnect unit (BDU), a charge resistor $340_{41}$ and/or a pre-charge resistor $340_{42}$. The battery disconnect unit can comprise a first circuit breaker $330_{41}$ as well as a first relay. The battery disconnect unit can further comprise a second circuit breaker $330_{42}$ as well as a second relay. The first circuit breaker $330_{41}$ and the second circuit breaker $330_{42}$ can, as shown by way of example in FIG. 1, be arranged at a right angle to one another so that they are influenced differently, i.e. not in the same way, by a force acting from the outside. The battery module $20_4$ can, as is shown by example in FIG. 2, further comprise a plurality of receptacles such as chambers for receiving the devices ($310_4, 320_4, 330_{41}, 330_{42}, 340_{41}, 340_{42}$) for monitoring and/or controlling the battery module(s).

A battery module $20_4$ comprising devices for monitoring and/or controlling is denoted as a "battery module of the type I". A battery module $20_1, \ldots 20_3$ without devices for monitoring and/or controlling is denoted as a "battery module of the type II".

The crash frame 400 can comprise a plurality of frame elements $410_1, \ldots 410_4$. The frame elements $410_1, \ldots 410_4$ can comprise metal such as steel. The frame elements $410_1, \ldots 410_4$ can be of solid construction or designed as profile elements.

The battery pack 10 can furthermore comprise a plurality of dividing elements $420_1, 420_2$. The dividing elements $420_1, 420_2$ can be disposed between the battery modules $20_1, \ldots 20_4$. Alternatively, the battery module housings $200_1, \ldots 200_4$ can each furthermore comprise a chamber such as a slot for receiving one of the dividing elements $420_1, 420_2$. The dividing elements $420_1, 420_2$ can comprise metal such as steel. The dividing elements $420_1$, $420_2$ can be of solid construction or designed as profile elements.

FIG. 2 shows a simplified top view of a battery module housing 200 of the battery pack 10 according to this embodiment of the invention.

The battery module housing 200 is, as shown in FIG. 2, designed as a prismatic battery module housing. The battery module housing 200 comprises a plurality of circumferential outer walls $210_1, \ldots 210_4$. The battery module housing can furthermore comprise a plurality of intermediate walls $220_1, \ldots 220_4$ for grouping the plurality of battery cells $100_{111}, \ldots 100_{142}$. The battery module housing 200 can furthermore comprise a plurality of dividing walls $230_{11}, \ldots 230_{41}$ for dividing and/or spacing apart of battery cells $100_{111}, \ldots 100_{142}$ that are adjacent to one another in a group. In so doing, the outer walls $210_1, \ldots 210_4$, intermediate walls $220_1, \ldots 220_4$ and/or dividing walls $230_{11}, \ldots 230_{41}$ can enclose the battery cell chambers $250_{11}, \ldots 250_{42}$.

The battery module housing 200 can comprise a base plate or a bottom grid.

The battery module housing 200 can comprise plastic. The battery module housing 200 can, for example, be produced by means of a molding process such as an injection molding process.

FIG. 3 shows a simplified side sectional view of the battery module housing 200 of the battery pack 10 according to this embodiment of the invention in accordance with a sectional line AB in FIG. 2.

The intermediate walls $220_1, \ldots 220_4$ and/or dividing walls $230_{11}, \ldots 230_{41}$ can, as shown by way of example in FIG. 3, have a lower height than the outer walls $210_1, \ldots 210_4$. This can, for example, enable the receiving of a circuit board 50. The dividing walls $230_{11}, \ldots 230_{41}$ can, as shown by way of example in FIG. 3, be configured in a rib-like manner.

Figure 4:
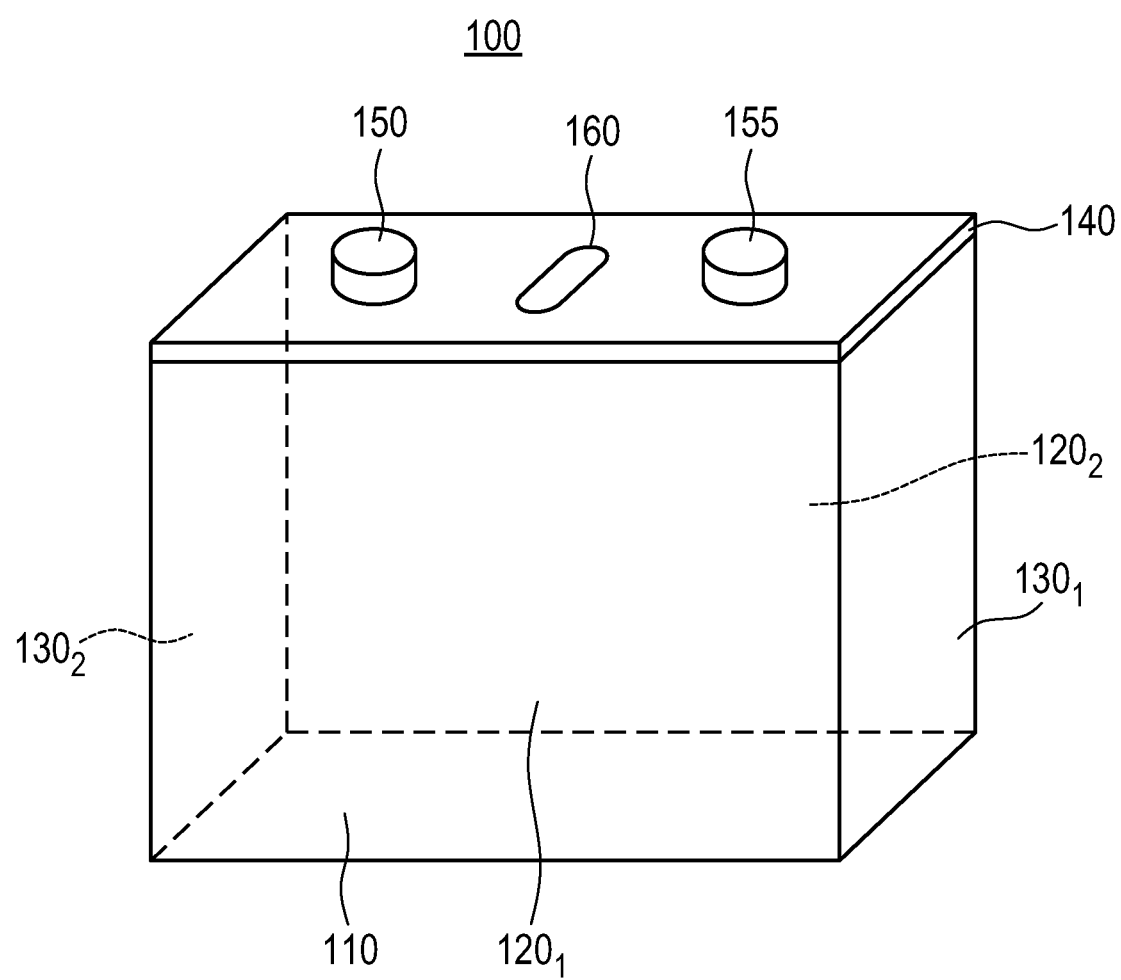
FIG. 4 shows a simplified perspective view of a battery cell of the battery pack according to this embodiment of the invention.

FIG. 4 shows a simplified perspective view of a battery cell 100 of the battery pack 10 according to this embodiment of the invention.

The battery cell 100 is, as is shown in FIG. 4, designed as a prismatic battery cell. The battery cell 100 comprises a battery cell housing and a battery cell cover 140. The battery cell housing comprises a rectangular base surface 110 having two long edges that are parallel to one another and two short edges that are parallel to one another as well as two large wall surfaces that are parallel to one another, namely a front wall surface $120_1$ and a back wall surface $120_2$, the length of which is determined by the long edges, and two small wall surfaces that are parallel to one another, namely a right side wall surface $130_1$ and a left side wall surface $130_2$, the width of which is determined by the short edges.

The battery cell cover 140 forms a rectangular surface, the long edges of which are determined by the large wall surfaces $120_1$, $120_2$ of the battery cell housing and the short edges of which are determined by the small side wall surfaces $130_1$, $130_2$ of the battery cell housing.

The battery cell housing and/or the battery cell cover 140 can comprise aluminum or steel.

The battery cell cover 140 comprises a first electrical connection (cell terminal) 150 which can be designed as a minus pole and a second electrical connection which can be designed as a plus pole. The first electrical terminal 150 and/or the second electrical terminal 155 can comprise metal such as aluminum, copper or steel. The battery cell cover 140 can furthermore, as shown by way of example in FIG. 4, comprise a valve 160 such as a pressure relief valve or burst valve for degassing the battery cell 100.

Figure 5:
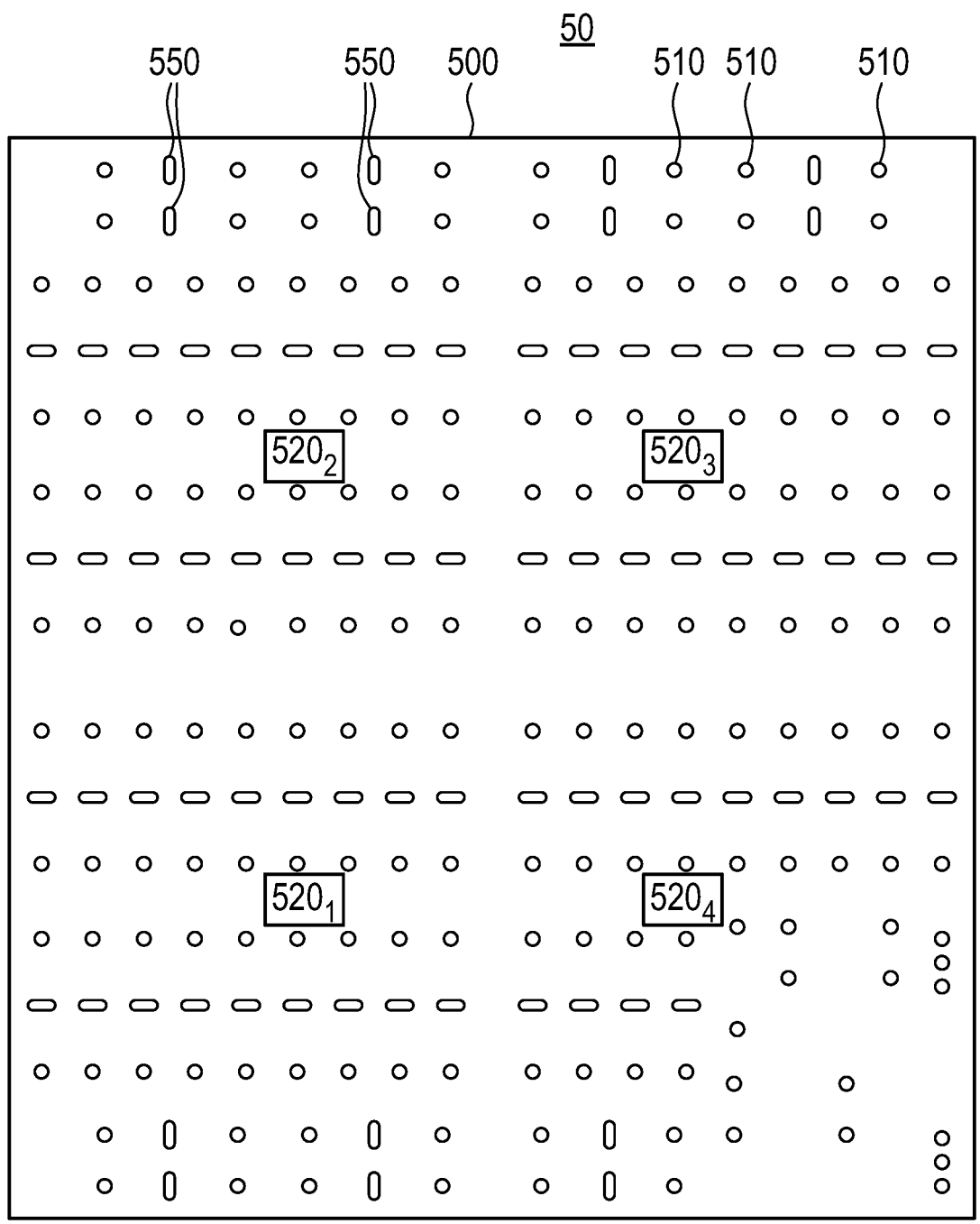
FIG. 5 shows a simplified top view of a circuit board of the battery pack according to this embodiment of the invention.

FIG. 5 shows a simplified top view of a circuit board 50 of the battery pack 10 according to this embodiment of the invention.

The circuit board 50 is used to electrically connect the battery cells $100_{111}, \ldots 100_{432}$ and/or the devices $310_4$, $320_4$, $330_{41}$, $330_{42}$, $340_{41}$, $340_{42}$ for monitoring and/or controlling. The circuit board 50 can, for example, be designed as a printed circuit board (PCB) or as a flexible circuit board. The circuit board 50 comprises a carrier element 500 and conductor tracks with connection contacts (not shown in FIG. 5). The carrier element 500 comprises a plurality of connection openings 510, the position and size of which are matched to the electrical terminals 150, 155 of the battery cells $100_{111}, \ldots 100_{432}$. The connection contacts can, for example, be connected through the connection openings 510 to the electrical terminals 150, 155 by means of screws, weldable wires or conductive films that can be adhesively attached. The carrier element 500 can furthermore comprise a plurality of degassing openings 560, the position and size of which are matched to the valves 160 of the battery cells $100_{111}, \ldots 100_{432}$. The circuit board 50 can furthermore comprise cell supervisory circuits (CSCs) $520_1, \ldots 520_4$ for monitoring the battery cells $100_{111}, \ldots 100_{432}$.

A method for producing a battery module $20_1, \ldots 20_4$ for a battery pack 10 can, for example include: providing a battery module housing $200_1 \ldots 200_4$, providing a large number of battery cells $100_{111}, \ldots 100_{432}$ which each have a large wall surface $120_1$, $120_2$ and a small wall surface $130_1$, $130_2$, of which small wall surface the surface area is less than a surface area of the large wall surface $120_1$, $120_2$ and arranging the battery cells $100_{111}, \ldots 100_{432}$ m the battery module housing $200_1, \ldots 200_4$, wherein the battery cells $100_{119}, 100_{129}, 100_{132}, 100_{142}, 100_{219}, 100_{229}, 100_{232}, 100_{242}, 100_{319}, 100_{329}, 100_{332}, 100_{342}, 100_{419}, 100_{432}$ which are arranged adjacent to the outer sides of the battery pack 10 are oriented in such a way that their large wall surfaces $120_1$, $120_2$ run along the outer sides, so that a force which acts on one of the outer sides can initially be received by one of the large wall surfaces $120_1$, $120_2$.

This method can further comprise: providing a device $310_4$, $320_4$, $330_{41}$, $330_{42}$, $340_{41}$, $340_{42}$ for monitoring and/or controlling battery cells $100_{111}, \ldots 100_{432}$ and arranging a device $310_4$, $320_4$, $330_{41}$, $330_{42}$, $340_{41}$, $340_{42}$ for monitoring and/or controlling said battery cells in the battery module housing $200_4$. The device $310_4$, $320_4$, $330_{41}$, $330_{42}$, $340_{41}$, $340_{42}$ for monitoring and/or controlling can be designed as a battery disconnect unit comprising a first circuit breaker $330_{41}$ and a second circuit breaker $330_{42}$. The first circuit breaker $330_{41}$ and the second circuit breaker $330_{42}$ can be arranged at right angles to one another; thus enabling them to be influenced differently, not in the same manner, by a force acting from the outside.

A method for producing a battery pack 10 can, for example, comprise: providing the battery module $20_1, \ldots 20_4$, providing a crash frame 400 and arranging the battery module $20_1, \ldots 20_4$ in the crash frame 400.

This method can further comprise; providing a circuit board 50, arranging the circuit board 50 on the battery module $20_1, \ldots 20_4$ and electrically connecting connection contacts of the circuit board 50 to electric terminals 150, 155 of the battery cells $100_{111}, \ldots 100_{432}$.

A method for producing a battery can, for example, comprise: providing the battery pack 10, providing a battery housing and arranging the battery pack 10 in the battery housing.

The invention claimed is:

1. A battery pack comprising:
   four outer sides that are configured to extend vertically during normal use of the battery pack,
   a plurality of battery module housings, and
   a plurality of battery cells, each of the battery module housings containing at least two of the battery cells, and each of the battery cells having a large wall surface and a small wall surface, a surface area of the small wall surface being less than a surface area of the large wall surface, wherein the battery cells which are arranged adjacent to the four outer sides of the battery pack are oriented in such a way that only the large wall surfaces of the battery cells adjacent to the four outer sides of the battery pack run along the four outer sides, so that a force which acts on one of the four outer sides can initially be received by one of the large wall surfaces of one of the battery cells adjacent to the four outer sides of the battery pack.

2. The battery pack according to claim 1, wherein at least one of the battery module housings includes
   a receptacle or receiving chamber for receiving a device for monitoring or controlling the plurality of battery cells.

3. The battery pack according to claim 2, wherein
   the device for monitoring or controlling said plurality of battery cells is a battery disconnect unit.

4. The battery pack according to claim 1, comprising a battery module, wherein the battery module includes:
   a device for monitoring or controlling the plurality of battery cells.

5. The battery pack according to claim 4, wherein
   the device for monitoring or controlling said plurality of battery cells is a battery disconnect unit.

6. A battery, comprising:
   the battery pack according to claim 1.

7. A vehicle, comprising:
   the battery according to claim 6.

8. A method for producing a battery pack having four outer sides that extend vertically during normal use of the battery pack, the method comprising:
   providing a plurality of battery module housings,
   providing a plurality of battery cells each having a large wall surface and a small wall surface, a surface area of the small wall surface being less than a surface area of the large wall surface, and
   arranging at least two of the plurality of battery cells in each of the plurality of battery module housings, wherein the battery cells which are arranged adjacent to four outer sides of the battery pack are oriented in such a way that only the large wall surfaces of the battery cells which are arranged adjacent to the four outer sides of the battery pack run along the four outer sides, so that a force which acts on one of the outer sides can initially be received by one of the large wall surfaces of the battery cells which are arranged adjacent to the four outer sides of the battery pack.

9. The method according to claim 8, furthermore comprising:
   providing a device for the monitoring and controlling of battery cells and
   arranging the device for monitoring and controlling said battery cells in the battery module housings.

10. The method according to claim 9, wherein:
    the device for the monitoring and controlling of battery cells is a battery disconnect unit,
    the battery disconnect unit comprises a first circuit breaker and a second circuit breaker, or
    the first circuit breaker and the second circuit breaker are arranged at right angles to one another, so that they cannot be influenced in the same way by the applied force.

11. A method for producing a battery pack, characterized by:
    providing the battery pack according to claim 1,
    providing a battery module including one of the battery module housings,
    providing a crash frame including the four outer sides, and
    arranging the battery module in the crash frame.

12. The method for producing a battery pack according to claim 11, furthermore comprising:
    providing a circuit board,
    arranging the circuit board on the battery module and
    electrically coupling connection contacts of the circuit board to electrical terminals (150, 155) of the battery cells.

13. A method for producing a battery, characterized by:
    providing the battery pack according to claim 1,
    providing a battery housing, and
    arranging the battery pack in the battery housing.

14. The battery pack of claim 1, wherein the battery module housing includes a plurality of battery cell chambers for receiving the plurality of battery cells.

15. The battery pack of claim 3, wherein the battery disconnect unit comprises a first circuit breaker and a second circuit breaker.

16. The battery pack of claim 15, wherein the first circuit breaker and the second circuit breaker are arranged at right angles to one another so that they cannot be influenced in the same way by the applied force.

17. The battery pack of claim 5, wherein the battery disconnect unit comprises a first circuit breaker and a second circuit breaker which are contained by one of the battery module housings.

18. The battery pack of claim 17, wherein the first circuit breaker and the second circuit breaker are arranged at right angles to one another so that they cannot be influenced in the same way by the applied force.

19. A battery pack comprising:
    four outer sides that are configured to extend vertically during normal use of the battery pack,
    a plurality of battery cells contained by the battery pack and each having a large wall surface and a small wall surface, a surface area of the small wall surface being less than a surface area of the large wall surface, wherein the battery cells which are arranged adjacent to the four outer sides of the battery pack are oriented in such a way that only the large wall surfaces of the battery cells adjacent to the four outer sides of the battery pack run along the four outer sides, so that a force which acts on one of the four outer sides can initially be received by one of the large wall surfaces of one of the battery cells adjacent to the four outer sides of the battery pack,
    a battery module, wherein the battery module includes a device for monitoring or controlling the plurality of battery cells,
    wherein the device for monitoring or controlling said plurality of battery cells is a battery disconnect unit,
    wherein the battery disconnect unit comprises a first circuit breaker and a second circuit breaker,
    wherein the first circuit breaker and the second circuit breaker are contained by the four outer sides and are arranged at right angles to one another so that they cannot be influenced in the same way by the applied force.

* * * * *